United States Patent
Shang

(10) Patent No.: US 10,634,512 B2
(45) Date of Patent: Apr. 28, 2020

(54) ROUTE NAVIGATION METHOD AND SYSTEM, TERMINAL, AND SERVER

(71) Applicant: Tencent Technology (Shenzhen) Company Limited, Shenzhen (CN)

(72) Inventor: Jian Shang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 262 days.

(21) Appl. No.: 15/785,201

(22) Filed: Oct. 16, 2017

(65) Prior Publication Data

US 2018/0038710 A1 Feb. 8, 2018

Related U.S. Application Data

(63) Continuation-in-part of application No. PCT/CN2016/078034, filed on Mar. 31, 2016.

(30) Foreign Application Priority Data

Oct. 27, 2015 (CN) .......................... 2015 1 0708125

(51) Int. Cl.
*G01C 21/26* (2006.01)
*G01C 21/36* (2006.01)
*G01C 21/34* (2006.01)

(52) U.S. Cl.
CPC ......... *G01C 21/3664* (2013.01); *G01C 21/26* (2013.01); *G01C 21/36* (2013.01);
(Continued)

(58) Field of Classification Search
CPC .. G01C 21/3664; G01C 21/36; G01C 21/367; G01C 21/3676; G01C 21/3688; G01C 21/3438
See application file for complete search history.

(56) References Cited

U.S. PATENT DOCUMENTS 6,347,278 B2 * 2/2002 Ito ...................... G01C 21/3415
340/988
9,417,082 B2 * 8/2016 Chang ................ G01C 21/3688
(Continued)

FOREIGN PATENT DOCUMENTS

| CN | 103791912 A | 5/2014 |
|---|---|---|
| CN | 103940439 A | 7/2014 |

(Continued)

OTHER PUBLICATIONS

Li et al., Route Navigation System in ZigBee-Based Sensor Networks, 2009, IEEE, p. 1-5 (Year: 2009).*

(Continued)

*Primary Examiner* — McDieunel Marc
(74) *Attorney, Agent, or Firm* — Morgan, Lewis & Bockius LLP

(57) ABSTRACT

A route navigation method, include: at a first terminal in communication with a second terminal via a navigation server: obtaining a starting point and a destination that are set by a user; displaying, on a navigation interface, the starting point and the destination; drawing, on the navigation interface, route information from the starting point to the destination according to a swipe gesture of the user on the navigation interface; and sending route forwarding instruction to the navigation server, wherein sending the route forwarding instruction includes: sending the route information to the navigation server, wherein the navigation server is configured to determine a navigation path from the starting point to the destination according to the route information, and sending a request for the navigation server to forward the navigation path to the second terminal to prompt another user to arrive at the destination from the starting point in accordance with the navigation path.

20 Claims, 3 Drawing Sheets

(52) U.S. Cl.
CPC ....... *G01C 21/367* (2013.01); *G01C 21/3676* (2013.01); *G01C 21/3688* (2013.01); *G01C 21/3438* (2013.01)

(56) References Cited

U.S. PATENT DOCUMENTS

| | | | |
|---|---|---|---|
| 9,423,265 B2* | 8/2016 | Suomela | G01C 21/3641 |
| 2001/0005809 A1* | 6/2001 | Ito | G01C 21/3415 |
| | | | 701/411 |
| 2003/0229441 A1* | 12/2003 | Pechatnikov | G01C 21/32 |
| | | | 701/411 |
| 2006/0069503 A1* | 3/2006 | Suomela | G01C 21/3641 |
| | | | 701/431 |
| 2008/0288165 A1* | 11/2008 | Suomela | G01C 21/3641 |
| | | | 701/533 |
| 2013/0131986 A1* | 5/2013 | Van Seggelen | G01C 21/3484 |
| | | | 701/533 |
| 2014/0365120 A1* | 12/2014 | Vulcano | G01C 21/36 |
| | | | 701/532 |
| 2015/0066360 A1 | 3/2015 | Kirsch | |
| 2018/0032997 A1* | 2/2018 | Gordon | G06Q 20/3224 |

FOREIGN PATENT DOCUMENTS

| | | |
|---|---|---|
| CN | 104677369 A | 6/2015 |
| CN | 104990560 A | 10/2015 |

OTHER PUBLICATIONS

Tian et al., A Remote Assistant Platform for the Blind Based on GIS, 2009, IEEE, p. 1-4 (Year: 2009).*

Li et al., A Proposed Intelligent Vehicle Telematics Service System (IVTS), 2006, IEEE, p. 866-869 (Year: 2006).*

Boonsrimuang et al., Mobile Internet navigation system, 2002, IEEE, p. 325-328 (Year: 2002).*

Tencent Technology, ISRWO, PCT/CN216/078034, dated Jul. 11, 2016, 8 pgs.

Tencent Technology, IPRP, PCT/CN216/078034, dated May 1, 2018, 7 pgs.

* cited by examiner

ROUTE NAVIGATION METHOD AND SYSTEM, TERMINAL, AND SERVER

RELATED APPLICATIONS

This application is a continuation-in-part application of PCT/CN2016/078034, entitled "ROUTE NAVIGATION METHOD, TERMINAL, SERVER AND SYSTEM" filed on Mar. 31, 2016, which claims priority to Chinese Patent Application No. 201510708125.4, filed with the State Intellectual Property Office of the People's Republic of China on Oct. 27, 2015, and entitled "ROUTE NAVIGATION METHOD AND SYSTEM, TERMINAL, AND SERVER", both of which are incorporated herein by reference in their entirety.

FIELD OF THE TECHNOLOGY

The present disclosure relates to the field of electronic technologies, and in particular, to a route navigation method and system, a terminal, and a server.

BACKGROUND OF THE DISCLOSURE

With constant development of mobile terminal technologies, at present, most mobile terminals have a navigation function. A user may plan a driving, walking, or public transit route by using navigation software. In an existing technical solution, a terminal may obtain a starting point and a destination, and then send information about the starting point and the destination to a navigation server. The navigation server selects at least one route for the user, and returns the at least one route to the terminal, so as to provide a navigation information reference for the user; or the user may get a taxi hailing service by using taxi hailing software having navigation and positioning functions. After a user 1 sends a taxi hailing service request by using taxi hailing software, the navigation server provides a user 2 with a navigation path to the location of the user 1, to provide a taxi hailing service for the user 1.

SUMMARY

In the state of art, navigation server provides suggested route to users based on predefined algorithms and stored road maps. However, because of constant road construction, it cannot be ensured that navigation data is the latest data or that the navigation path provided by the navigation server for the user is the optimal route. Second, the navigation path provided by the navigation server for the user may be inaccurate, affecting use experience for the navigation service.

Embodiments of the present disclosure provide a route navigation method and system, a terminal, and a server, to improve accuracy and user experience of route navigation.

One aspect of the present disclosure provides a route navigation method, including:
 obtaining a starting point and a destination that are set by a user;
 displaying, on a navigation interface, the starting point and the destination;
 drawing, on the navigation interface, route information from the starting point to the destination according to a swipe gesture of the user on the navigation interface; and
 sending the route information to a navigation server, wherein the navigation server is configured to determine a navigation path from the starting point to the destination according to the route information, and further sends the navigation path to another terminal to prompt another user to arrive at the destination from the starting point in accordance with the navigation path.

In one implementation of the present disclosure, the displaying, on a navigation interface, the starting point and the destination includes:
 obtaining a preset zoom ratio of the navigation interface; and
 displaying, on the navigation interface, the starting point and the destination according to the zoom ratio of the navigation interface.

In accordance with some embodiments, the displaying, on the navigation interface, the starting point and the destination according to the zoom ratio of the navigation interface includes:
 determining coordinate locations of the starting point and the destination on a screen at the zoom ratio of the navigation interface;
 adjusting the zoom ratio of the navigation interface if the coordinate location of the starting point or the destination on the screen is out of a display area of the screen; and
 displaying the starting point and the destination according to the adjusted zoom ratio of the navigation interface.

In some embodiments, before the drawing, on the navigation interface, route information from the starting point to the destination according to a swipe gesture of the user on the navigation interface, the method further includes:
 receiving an operation instruction that is entered by the user for the navigation interface; and
 switching the navigation interface to an edit mode according to the operation instruction for the navigation interface.

Correspondingly, another aspect of the present disclosure provides a route navigation method, including:
 receiving route information from a starting point to a destination, the route information being sent by a terminal and drawn on a navigation interface;
 determining a navigation path from the starting point to the destination according to the route information; and
 sending the navigation path to another terminal, wherein the another terminal displays the navigation path to prompt another user to arrive at the destination from the starting point in accordance with the navigation path.

In some embodiments, the route information includes latitude and longitude of the starting point, latitude and longitude of the destination, and a drawn route, and the determining a navigation path from the starting point to the destination according to the route information includes:
 determining multiple routes from the starting point to the destination according to the latitude and longitude of the starting point and the latitude and longitude of the destination; and
 selecting, from the determined multiple routes, a target route closest to the drawn route, and using the target route as the navigation path.

In some embodiments, after the determining a navigation path from the starting point to the destination according to the route information, the method further includes:
 calculating execution duration from the starting point to the destination according to the navigation path from the starting point to the destination; and
 sending the execution duration to the another terminal, wherein the another terminal displays the execution duration.

Correspondingly, yet another aspect of the present disclosure provides a terminal, including:
- a location obtaining module, configured to obtain a starting point and a destination that are set by a user;
- a location display module, configured to display, on a navigation interface, the starting point and the destination;
- a route drawing module, configured to draw, on the navigation interface, route information from the starting point to the destination according to a swipe gesture of the user on the navigation interface; and
- an information sending module, configured to send the route information to a navigation server, wherein the navigation server is configured to determine a navigation path from the starting point to the destination according to the route information, and further sends the navigation path to another terminal to prompt another user to arrive at the destination from the starting point in accordance with the navigation path.

In some embodiments, the location display module includes:
- a ratio obtaining unit, configured to obtain a preset zoom ratio of the navigation interface; and
- a location display unit, configured to display, on the navigation interface, the starting point and the destination according to the zoom ratio of the navigation interface.

In some embodiments, the location display unit is specifically configured to:
- determine coordinate locations of the starting point and the destination on a screen at the zoom ratio of the navigation interface;
- adjust the zoom ratio of the navigation interface if the coordinate location of the starting point or the destination on the screen is out of a display area of the screen; and
- display the starting point and the destination according to the adjusted zoom ratio of the navigation interface.

In some embodiments, the route drawing module is further configured to: receive an operation instruction entered by the user for the navigation interface; and switch the navigation interface to an edit mode according to the operation instruction for the navigation interface.

Correspondingly, yet another aspect of the present disclosure provides a navigation server, including:
- an information receiving module, configured to receive route information from a starting point to a destination, the route information being sent by a terminal and drawn on a navigation interface;
- an information determining module, configured to determine a navigation path from the starting point to the destination according to the route information; and
- an information sending module, configured to send the navigation path to another terminal, wherein the another terminal displays the navigation path to prompt another user to arrive at the destination from the starting point in accordance with the navigation path.

In some embodiments, the route information includes latitude and longitude of the starting point, latitude and longitude of the destination, and a drawn route, and the information determining module is specifically configured to:
- determine multiple routes from the starting point to the destination according to the latitude and longitude of the starting point and the latitude and longitude of the destination; and
- select, from the determined multiple routes, a target route closest to the drawn route, and use the target route as the navigation path.

In some embodiments,
- the information determining module is further configured to calculate execution duration from the starting point to the destination according to the navigation path from the starting point to the destination; and
- the information sending module is further configured to send the execution duration to the another terminal, wherein the another terminal displays the execution duration.

Correspondingly, yet another aspect of the present disclosure provides a route navigation system, including a terminal and a navigation server,
- the terminal being configured to: obtain a starting point and a destination that are set by a user; display, on a navigation interface, the starting point and the destination; draw, on the navigation interface, route information from the starting point to the destination according to a swipe gesture of the user on the navigation interface; and send the route information to the navigation server, wherein the navigation server is configured to determine a navigation path from the starting point to the destination according to the route information, and further sends the navigation path to another terminal to prompt another user to arrive at the destination from the starting point in accordance with the navigation path; and
- the navigation server being configured to: receive the route information from the starting point to the destination, the route information being sent by the terminal and drawn on the navigation interface; determine the navigation path from the starting point to the destination according to the route information; and send the navigation path to the another terminal, wherein the another terminal displays the navigation path to prompt the another user to arrive at the destination from the starting point in accordance with the navigation path.

During implementation of the embodiments of the present disclosure, first, a starting point and a destination that are set by a user are obtained. Then, the starting point and the destination are displayed on a navigation interface. Next, route information from the starting point to the destination is drawn on the navigation interface according to a swipe gesture of the user on the navigation interface. Finally, the route information is sent to a navigation server, wherein the navigation server is configured to determine a navigation path from the starting point to the destination according to the route information, and sends the navigation path to another terminal to prompt another user to arrive at the destination from the starting point in accordance with the navigation path. In this way, accuracy of route navigation is improved.

BRIEF DESCRIPTION OF THE DRAWINGS

To describe the technical solutions in embodiments of the present disclosure more clearly, the accompanying drawings required for describing the embodiments are briefly described below. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
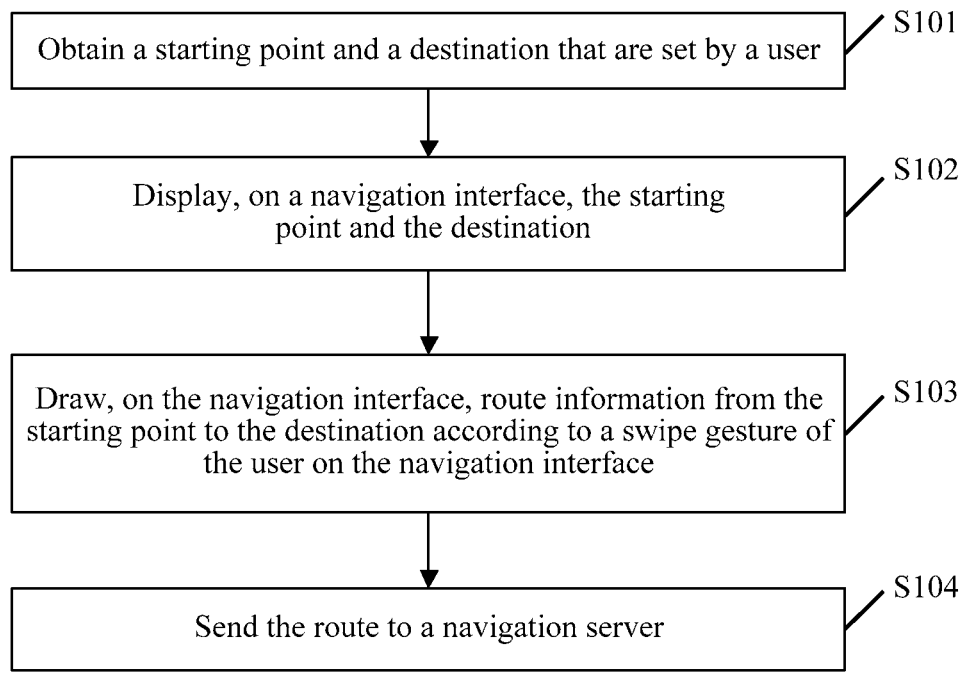
FIG. 1 is a schematic flowchart of a route navigation method according to some embodiments of the present disclosure.

Referring to FIG. 1, FIG. 1 is a schematic flowchart of a first embodiment of a route navigation method according to the present disclosure. This embodiment of the present disclosure is executed by a terminal. As shown in FIG. 1, the method in this embodiment of the present disclosure includes S101 to S104:

S101: Obtain a starting point and a destination that are set by a user.

During specific implementation, after a navigation interface of navigation software is opened, a starting point of the user may be directly obtained by using the Global Positioning System (GPS), and a destination entered by the user is obtained; or both a starting point and a destination that are entered by the user may be obtained.

S102: Display, on a navigation interface, the starting point and the destination.

During specific implementation, a confirmation instruction entered by the user may be received after the starting point and the destination are obtained. The starting point and the destination are displayed on the navigation interface according to the confirmation instruction entered by the user. In some embodiments, the user enters the start and destination points in a navigation module of a social network application. In some embodiments, the user enters the start and destination points in a user interface of a taxi hailing application.

Optionally, a preset zoom ratio of the navigation interface may be obtained in accordance with a distance between the starting point and the destination point. The starting point and the destination are displayed on the navigation interface according to the zoom ratio of the navigation interface. Further, coordinate locations of the starting point and the destination on a screen at the zoom ratio of the navigation interface may be determined. The zoom ratio of the navigation interface is adjusted if the coordinate location of the starting point or the destination on the screen is out of a predefined region of the display area of the screen (e.g., outside of the central 90% of the display area of the screen, or outside of the display area of the screen, or outside the map display region of the screen, or outside 90% of the central region of the map display area, etc.). The starting point and the destination are displayed according to the adjusted zoom ratio of the navigation interface to fit the starting point and the destination within the predefine area of the display area of the screen.

Specifically, the first displayed zoom ratio of the navigation interface is relatively small, and the starting point and the destination cannot be accurately displayed. Therefore, the user cannot draw, on an operation interface, route information from the starting point to the destination by using a swipe gesture. The user may preset a zoom ratio of the navigation interface. The zoom ratio of the navigation interface may be a maximum ratio, wherein the terminal displays, on the navigation interface, the starting point and the destination according to the maximum ratio. If the starting point or the destination is out of the display area of the screen after zoom processing is performed according to the maximum ratio, the terminal may automatically reduce the zoom ratio, and display the starting point and the destination in a largest range in the map display area of the screen.

Optionally, a pinch zoom operation of the user on the navigation interface may be received. The navigation interface is zoomed in/out according to the pinch zoom operation on the navigation interface. For example, the user may perform a pinch zoom operation on the navigation interface by moving two fingers apart, so as to zoom in the navigation interface; or the user may perform a pinch zoom operation on the navigation interface by bringing two fingers closer together, so as to zoom out the navigation interface.

S103: Draw, on the navigation interface, route information from the starting point to the destination according to a swipe gesture of the user on the navigation interface.

During specific implementation, an operation instruction that is entered by the user for the navigation interface may be received. The navigation interface is switched to an edit mode according to the operation instruction for the navigation interface, so as to draw, on the navigation interface, the route information from the starting point to the destination in the edit mode. After the route information from the starting point to the destination is drawn, the drawn route may be modified, until the user determines that drawing of the route information has been completed. The route information may include latitude and longitude of the starting point, latitude and longitude of the destination, and a drawn route. The drawn route may be identified in a color other than a color of the navigation interface. In some embodiments, after the user specifies the destination and starting point, the navigation server provides a suggested route to the terminal, and the terminal displays the suggested route to the user. In some embodiments, the user modifies the suggested route by selecting one or more turning points on the suggested route and drag the turning points to new locations on the map, and thereby modify the suggested route. In some embodiments, the user starts from a point on the suggested route (including the starting point of the suggested route or anywhere along the suggested route) and hand-draws at least a portion of route that deviates from the suggested route, e.g., to take a shortcut, or to avoid a construction zone, or a high traffic area, known to the user, and not known to the navigation server.

S104: Send the route information to a navigation server, wherein the navigation server is configured to determine a navigation path from the starting point to the destination according to the route information, and further sends the navigation path to another terminal (e.g., a social network contact of the user, or a driver that has accepted the service request to drive the user from the start point to the destination point) to prompt another user to arrive at the destination from the starting point in accordance with the navigation path.

During specific implementation, the route information is sent to the navigation server when a confirmation instruction of the user for the route information is detected. The navigation server determines the navigation path from the starting point to the destination according to the route information, and further sends the navigation path to the another terminal, wherein the another terminal displays the navigation path to prompt the another user to arrive at the destination from the starting point in accordance with the navigation path. In addition, the navigation server may calculate execution duration (e.g., estimated time of arrival) from the starting point to the destination according to the navigation path from the starting point to the destination; and send the execution duration to the another terminal, wherein the another terminal displays the execution duration.

For example, a user 1 sends a taxi hailing service request by using taxi hailing software. A user 2 decides to take the order after receiving the taxi hailing service request, and sends a confirmation message to a terminal of the user 1. In this case, the terminal of the user 1 may view, by using the taxi hailing software, a starting point where the terminal is located and a destination where the user 2 is located, draw a route on a navigation interface, and push the drawn route to the navigation server. After receiving the drawn route recommended by the terminal of the user 1, the navigation server selects, from multiple routes from the starting point to the destination, a navigation path closest to the drawn route, and sends the navigation path to a terminal of the user 2, wherein the user 2 may pick up the user 1 according to the navigation path.

In this embodiment of the present disclosure, first, a starting point and a destination that are set by a user are obtained. Then, the starting point and the destination are displayed on a navigation interface. Next, route information from the starting point to the destination is drawn on the navigation interface according to a swipe gesture of the user on the navigation interface. Finally, the route information is sent to a navigation server, wherein the navigation server is configured to determine a navigation path from the starting point to the destination according to the route information, and sends the navigation path to another terminal to prompt another user to arrive at the destination from the starting point in accordance with the navigation path. In this way, accuracy of route navigation is improved.

Figure 2:
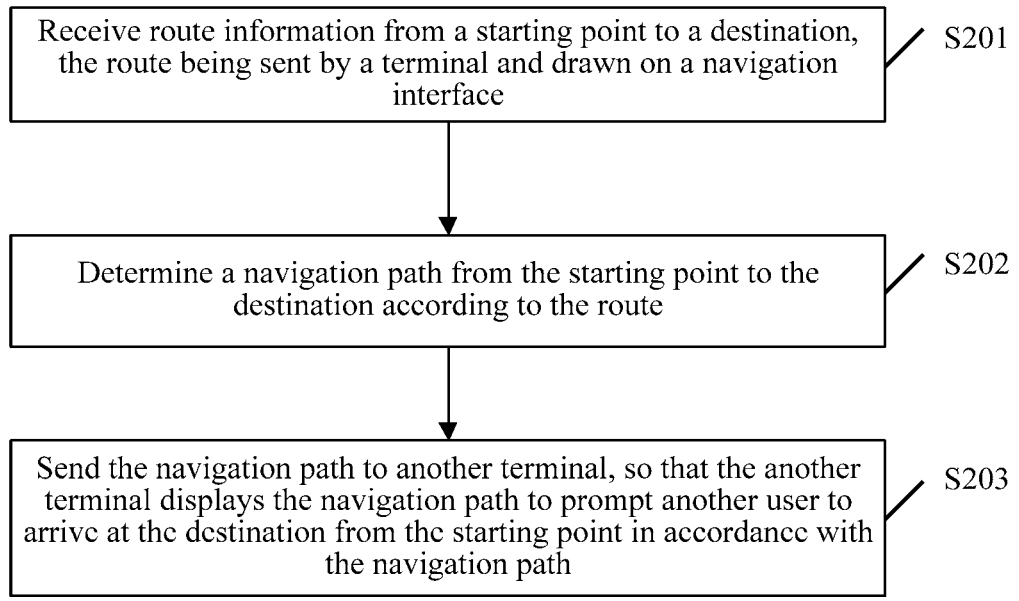
FIG. 2 is a schematic flowchart of a route navigation method according to some embodiments of the present disclosure.

Referring to FIG. 2, FIG. 2 is a schematic flowchart of a second embodiment of a route navigation method according to the present disclosure. This embodiment of the present disclosure is executed by a navigation server. As shown in FIG. 2, the method in this embodiment of the present disclosure includes S201 to S203:

S201: Receive route information from a starting point to a destination, the route information being sent by a terminal and drawn on a navigation interface.

During specific implementation, the terminal first obtains the starting point and the destination that are set by a user; then displays, on the navigation interface, the starting point and the destination; next draws, on the navigation interface, the route information from the starting point to the destination according to a swipe gesture of the user on the navigation interface; and finally sends the route information to a navigation server. The navigation server receives the route information.

S202: Determine a navigation path from the starting point to the destination according to the route information.

During specific implementation, the route information includes latitude and longitude of the starting point, latitude and longitude of the destination, and a drawn route. Multiple routes from the starting point to the destination may be determined according to the latitude and longitude of the starting point and the latitude and longitude of the destination. A target route closest to the drawn route may be selected from the determined multiple routes, and the target route is used as the navigation path.

Optionally, execution duration from the starting point to the destination may be calculated according to the navigation path from the starting point to the destination. Specifically, the length of the navigation path may be obtained, and the length of the navigation path is divided by an average speed to obtain the execution duration.

S203: Send the navigation path to another terminal, wherein the another terminal displays the navigation path to prompt another user to arrive at the destination from the starting point in accordance with the navigation path.

During specific implementation, the another terminal may send a navigation request to the navigation server. The navigation request carries the latitude and longitude of the starting point and the latitude and longitude of the destination. After receiving the navigation request, the navigation server may send the navigation path from the starting point to the destination to the another terminal, so as to share the route information entered by the user with the another user.

Optionally, the navigation server may receive a zoom ratio of the navigation interface sent by the terminal, and send the zoom ratio of the navigation interface to the another terminal, wherein the another terminal displays the navigation path according to the zoom ratio of the navigation interface.

Optionally, the navigation server may send the calculated execution duration from the starting point to the destination to the another terminal to notify the another user of the time that is spent from the starting point to the destination.

In this embodiment of the present disclosure, first, a starting point and a destination that are set by a user are obtained. Then, the starting point and the destination are displayed on a navigation interface. Next, route information from the starting point to the destination is drawn on the navigation interface according to a swipe gesture of the user on the navigation interface. Finally, the route information is sent to a navigation server, wherein the navigation server is configured to determine a navigation path from the starting point to the destination according to the route information, and sends the navigation path to another terminal to prompt another user to arrive at the destination from the starting point in accordance with the navigation path. In this way, accuracy of route navigation is improved.

Figure 3:
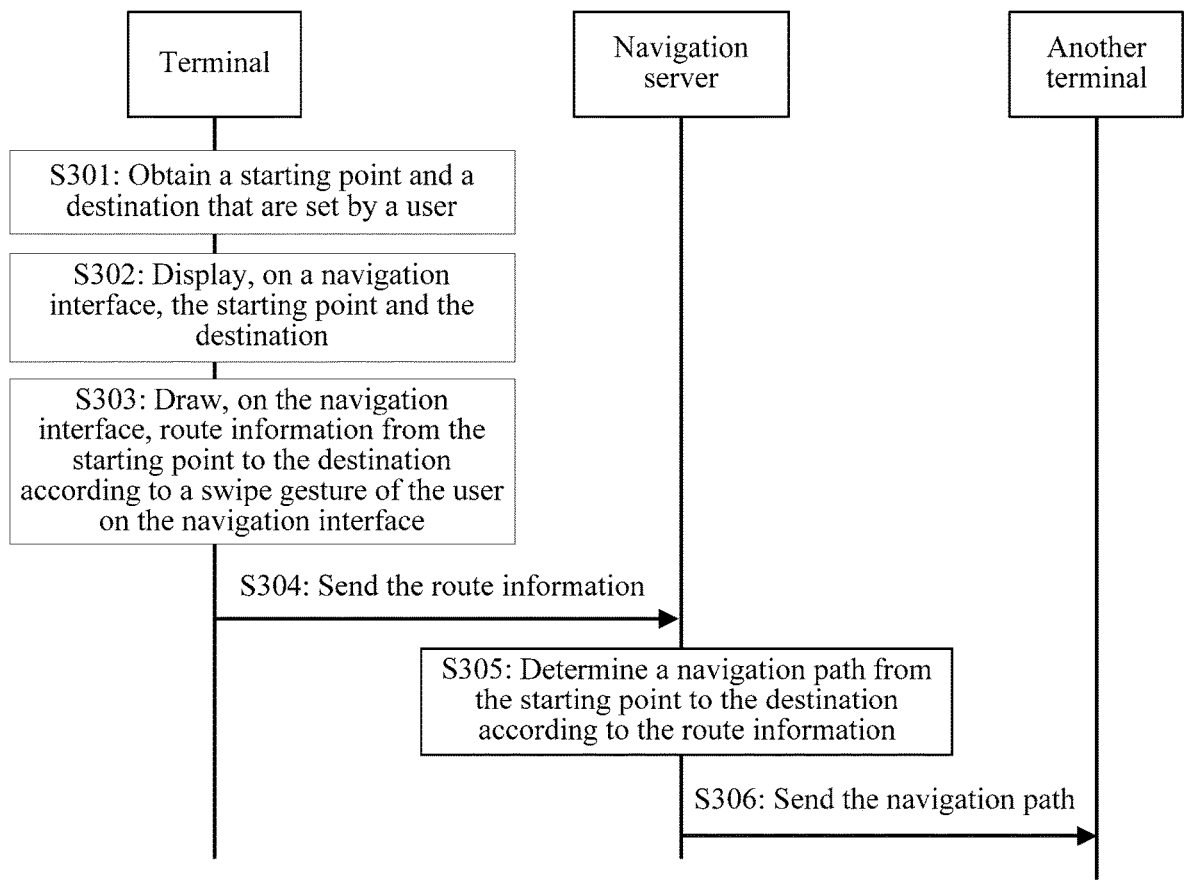
FIG. 3 is a schematic flowchart of a route navigation method according to some embodiments of the present disclosure.

Referring to FIG. 3, FIG. 3 is a schematic flowchart of a third embodiment of a route navigation method according to the present disclosure. As shown in FIG. 3, the method in this embodiment of the present disclosure includes S301 to S306:

S301: A terminal obtains a starting point and a destination that are set by a user.

During specific implementation, after a navigation interface of navigation software is opened, a starting point of the user may be directly obtained by using the GPS, and a destination entered by the user is obtained; or both a starting point and a destination that are entered by the user may be obtained.

S302: The terminal displays, on a navigation interface, the starting point and the destination.

During specific implementation, a confirmation instruction entered by the user may be received after the starting point and the destination are obtained. The starting point and the destination are displayed on the navigation interface according to the confirmation instruction entered by the user.

Optionally, a preset zoom ratio of the navigation interface may be obtained. The starting point and the destination are displayed on the navigation interface according to the zoom ratio of the navigation interface. Further, coordinate locations of the starting point and the destination on a screen at the zoom ratio of the navigation interface may be determined. The zoom ratio of the navigation interface is adjusted if the coordinate location of the starting point or the destination on the screen is out of a display area of the screen. The starting point and the destination are displayed according to the adjusted zoom ratio of the navigation interface.

Specifically, the first displayed zoom ratio of the navigation interface is relatively small, and the starting point and the destination cannot be accurately displayed. Therefore, the user cannot draw, on an operation interface, route information from the starting point to the destination by using a swipe gesture. The user may preset a zoom ratio of the navigation interface. The zoom ratio of the navigation interface may be a maximum ratio, wherein the terminal displays, on the navigation interface, the starting point and the destination according to the maximum ratio. If the starting point or the destination is out of the display area of the screen after zoom processing is performed according to the maximum ratio, the terminal may automatically reduce the zoom ratio, and display the starting point and the destination in a largest range in the display area of the screen.

Optionally, a pinch to zoom operation of the user on the navigation interface may be received. The navigation interface is zoomed in/out according to the pinch to zoom operation on the navigation interface. For example, the user may perform a pinch to zoom operation on the navigation interface by moving two fingers apart, so as to zoom in the navigation interface; or the user may perform a pinch to zoom operation on the navigation interface by bringing two fingers closer together, so as to zoom out the navigation interface.

S303: The terminal draws, on the navigation interface, route information from the starting point to the destination according to a swipe gesture of the user on the navigation interface.

During specific implementation, an operation instruction that is entered by the user for the navigation interface may be received. The navigation interface is switched to an edit mode according to the operation instruction for the navigation interface, so as to draw, on the navigation interface, the route information from the starting point to the destination in the edit mode. After the route information from the starting point to the destination is drawn, the drawn route may be modified, until the user determines that drawing of the route information has been completed. The route information may include latitude and longitude of the starting point, latitude and longitude of the destination, and a drawn route. The drawn route may be identified in a color other than a color of the navigation interface.

S304: The terminal sends the route information to a navigation server.

S305: The navigation server determines a navigation path from the starting point to the destination according to the route information.

During specific implementation, the route information includes latitude and longitude of the starting point, latitude and longitude of the destination, and a drawn route. Multiple routes from the starting point to the destination may be determined according to the latitude and longitude of the starting point and the latitude and longitude of the destination. A target route closest to the drawn route may be selected from the determined multiple routes, and the target route is used as the navigation path.

Optionally, execution duration from the starting point to the destination may be calculated according to the navigation path from the starting point to the destination. Specifically, the length of the navigation path may be obtained, and the length of the navigation path is divided by an average speed to obtain the execution duration.

S306: The navigation server sends the navigation path to another terminal, wherein the another terminal displays the navigation path to prompt another user to arrive at the destination from the starting point in accordance with the navigation path.

During specific implementation, the another terminal may send a navigation request to the navigation server. The navigation request carries the latitude and longitude of the starting point and the latitude and longitude of the destination. After receiving the navigation request, the navigation server may send the navigation path from the starting point to the destination to the another terminal, so as to share the route information entered by the user with the another user.

Optionally, the navigation server may receive a zoom ratio of the navigation interface sent by the terminal, and send the zoom ratio of the navigation interface to the another terminal, wherein the another terminal displays the navigation path according to the zoom ratio of the navigation interface.

Optionally, the navigation server may send the calculated execution duration from the starting point to the destination to the another terminal to notify the another user of the time that is spent from the starting point to the destination.

For example, a user 1 sends a taxi hailing service request by using taxi hailing software. A user 2 determines to take the order after receiving the taxi hailing service request, and sends a confirmation message to a terminal of the user 1. In this case, the terminal of the user 1 may view, by using the taxi hailing software, a starting point where the terminal is located and a destination where the user 2 is located, draw a route on a navigation interface, and push the drawn route to the navigation server. After receiving the drawn route recommended by the terminal of the user 1, the navigation server selects, from multiple routes from the starting point to the destination, a navigation path closest to the drawn route, and sends the navigation path to a terminal of the user 2, wherein the user 2 may pick up the user 1 according to the navigation path.

In this embodiment of the present disclosure, first, a starting point and a destination that are set by a user are obtained. Then, the starting point and the destination are displayed on a navigation interface. Next, route information from the starting point to the destination is drawn on the navigation interface according to a swipe gesture of the user on the navigation interface. Finally, the route information is sent to a navigation server, wherein the navigation server determines a navigation path from the starting point to the destination according to the route information, and sends the navigation path to another terminal to prompt another user to arrive at the destination from the starting point in accordance with the navigation path. In this way, accuracy of route navigation is improved.

Based on the above, in some embodiments, a route navigation method includes: at a first terminal having one or more processors and memory, the first terminal configured to be in communication with a second terminal via a navigation server: obtaining a starting point and a destination that are set by a user; displaying, on a navigation interface, the starting point and the destination; drawing, on the navigation interface, route information from the starting point to the destination according to a swipe gesture of the user on the navigation interface; and sending route forwarding instruction to the navigation server, wherein sending the route forwarding instruction includes: sending the route information to the navigation server, wherein the navigation server is configured to determine a navigation path from the starting point to the destination according to the route information, and sending a request for the navigation server to forward the navigation path to the second terminal to prompt another user to arrive at the destination from the starting point in accordance with the navigation path.

In some embodiments, displaying, on the navigation interface, the starting point and the destination includes: obtaining a preset zoom ratio of the navigation interface in accordance with a distance between the starting point and the destination point; and displaying, on the navigation interface, the starting point and the destination according to the zoom ratio of the navigation interface.

In some embodiments, the route information includes a hand-drawn route, and the determining the navigation path from the starting point to the destination according to the route information includes: determining multiple routes from the starting point to the destination; and selecting, from the determined multiple routes, a target route closest to the hand-drawn route as the navigation path.

In some embodiments, the method includes: prior to receiving the swipe gesture from the user, displaying, to a user, a suggested route from the starting point to the destination that is generated by the navigation server in accordance with preset routing algorithm, wherein the swipe gesture modifies at least a portion of the suggested route. In some embodiments, the method further includes: receiving the swipe gesture from the user, wherein the swipe gesture drags one or more points on the suggested route to modify the suggested route. In some embodiments, the method further includes: receiving the swipe gesture from the user, wherein the swipe gesture draws a line on the navigation interface that replaces at least a portion of the suggested route.

In some embodiments, the navigation interface is displayed in a ride request application interface, the first terminal is a rider's terminal and the second terminal is a driver's terminal.

In some embodiments, when the first terminal belongs to a rider in the current scenario and the second terminal belongs to the driver that has accepted the ride request from the user. The starting point is the current location of the driver, and the destination is the current location of the user that is in need of the ride. In some embodiments, after the driver has arrived at the location of the user that is in need of the ride, in accordance with the hand-drawn route provided by the user, a new route is generated for a new starting location and a new destination, where the new starting location is the current location of the user and the driver (together), and the new destination location is the destination location that the user has entered in the ride request. In some embodiments, either the user or the drive may use swipe gestures to modify a suggested route linking the new starting location and the new destination location, and once both the user and the driver have approved the modified route, the modified route is provided to the driver so that the drive can drive the user to the destination in accordance with the modified route.

In some embodiments, when the user input for modifying the suggested route is submitted to the navigation server, the navigation server determines whether the modification includes one or more possible errors (e.g., a conflict with the stored road maps, or a turn that is against traffic rules, or the route has a current road incident report, etc.). In accordance with a determination that the modification includes one or more possible errors, the navigation displays the one or more possible errors to the user and requests confirmation or further modification of the route. In some embodiments, in accordance with a determination that the user has confirmed that the possible errors can be ignored or that there is no possible errors detected by the navigation server, the navigation server generates the modified route and sends it to both the terminals of the user and another user (e.g., the driver that has accepted the ride request, or a social network contact of the user).

In some embodiments, the method further include: receiving a second gesture (e.g., a two-finger swipe gesture) on the map along the route that indicates a suggested parking area for the other user (e.g., the user of the other terminal, the driver, or the social network contact of the user). In some embodiments, before using the second gesture, the user selects a parking option affordance in the navigation interface when in the edit mode of the navigation interface.

In some embodiments, after the user sends a ride request that specifies a starting point and a destination, and a driver accepts the ride request, the driver's current location is sent to the user. Once the user receives the current location of the driver, the user hand-draws a route for at least a portion of a possible route from the driver's current location to the user's current location. The hand drawn route is used to generate a complete route for the driver to arrive at the user's current location. Once the driver has arrived, the navigation server generates another route from the current location of the user and the driver to the destination specified by the user in the ride request. Either the driver or the user may edit the route in the manner described herein.

In some embodiments, in response to detecting a change in road condition (e.g., a new incident report, a change in traffic pattern, etc.) along the modified route, the navigation server sends another suggested route to the first and second terminals based on the current location of the driver and the current location of the user, after navigation of the driver according to the modified route has started. The user or driver may reject the new suggested route, and continue to navigate according to the original modified route. In some embodiments, the terminal automatically zoom to a portion of the route for which a new incident report has been received from the navigation server, until a editing command or a dismissal input is received from the user of the terminal.

In some embodiments, the user may specify a route with multiple transportation modes for different portions of the route. For example, after selecting a "walking" affordance, the user can use a first swipe gesture to specify a portion of the route that is to be executed by walking. Then after selecting a driving affordance, the user can use a second swipe gesture to specify a second portion of the route that is to be executed by driving. Then after selecting the "parking" affordance, the user can use a third swipe gesture to specify a parking area. Then after selecting the "walking" affordance again, the user can use a fourth swipe gesture to specify a final portion of the route. The terminal receives these route information entered by the user, and sends them to the navigation server, and the navigation server generates a multi-modal route according to the route information, and sends the route to the second terminal and the first terminal.

The above method is described from the perspective of the first terminal, and corresponding operations of the second terminal and the navigation server are apparent based on the disclosure earlier and the disclosure of the actions of the first terminal. In the interest of brevity, the actions of the navigation server and the second terminal are not exhaustively listed herein.

Figure 4:
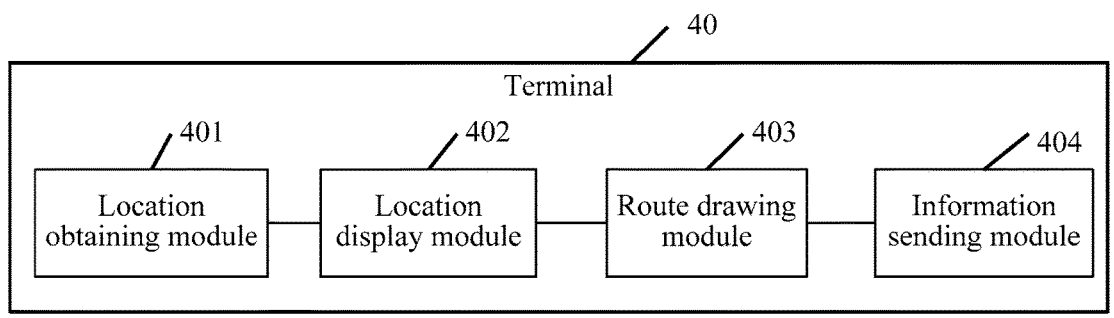
FIG. 4 is a schematic structural diagram of a terminal according to some embodiments of the present disclosure.

Referring to FIG. 4, FIG. 4 is a schematic structural diagram of a terminal according to an embodiment of the present disclosure. As shown in FIG. 4, the terminal in this embodiment of the present disclosure includes: a location obtaining module 401, a location display module 402, a route drawing module 403, and an information sending module 404.

The location obtaining module 401 is configured to obtain a starting point and a destination that are set by a user.

During specific implementation, after a navigation interface of navigation software is opened, a starting point of the user may be directly obtained by using the GPS, and a destination entered by the user is obtained; or both a starting point and a destination that are entered by the user may be obtained.

The location display module 402 is configured to display, on a navigation interface, the starting point and the destination.

During specific implementation, a confirmation instruction entered by the user may be received after the starting point and the destination are obtained. The starting point and the destination are displayed on the navigation interface according to the confirmation instruction entered by the user.

Figure 5:
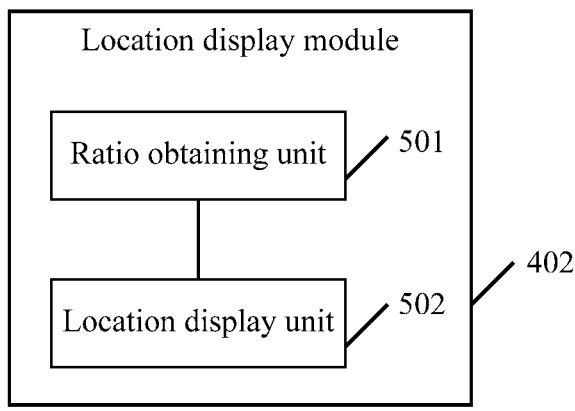
FIG. 5 is a schematic structural diagram of a location display module of a terminal according to some embodiments of the present disclosure.

Optionally, as shown in FIG. 5, the location display module 402 may further include a ratio obtaining unit 501 and a location display unit 502. The ratio obtaining unit 501 is configured to obtain a preset zoom ratio of the navigation interface. The location display unit 502 is configured to display, on the navigation interface, the starting point and the destination according to the zoom ratio of the navigation interface. Further, coordinate locations of the starting point and the destination on a screen at the zoom ratio of the navigation interface may be determined. The zoom ratio of the navigation interface is adjusted if the coordinate location of the starting point or the destination on the screen is out of a display area of the screen. The starting point and the destination are displayed according to the adjusted zoom ratio of the navigation interface.

Specifically, the first displayed zoom ratio of the navigation interface is relatively small, and the starting point and the destination cannot be accurately displayed. Therefore, the user cannot draw, on an operation interface, route information from the starting point to the destination by using a swipe gesture. The user may set a zoom ratio of the navigation interface. The zoom ratio of the navigation interface may be a maximum ratio, wherein the terminal displays, on the navigation interface, the starting point and the destination according to the maximum ratio. If the starting point or the destination is out of the display area of the screen after zoom processing is performed according to the maximum ratio, the terminal may automatically reduce the zoom ratio, and display the starting point and the destination in a largest range in the display area of the screen.

Optionally, a pinch to zoom operation of the user on the navigation interface may be received. The navigation interface is zoomed in/out according to the pinch to zoom operation on the navigation interface. For example, the user may perform a pinch to zoom operation on the navigation interface by moving two fingers apart, so as to zoom in the navigation interface; or the user may perform a pinch to zoom operation on the navigation interface by bringing two fingers closer together, so as to zoom out the navigation interface.

The route drawing module 403 is configured to draw, on the navigation interface, route information from the starting point to the destination according to a swipe gesture of the user on the navigation interface.

During specific implementation, an operation instruction that is entered by the user for the navigation interface may be received. The navigation interface is switched to an edit mode according to the operation instruction for the navigation interface, so as to draw, on the navigation interface, the route information from the starting point to the destination in the edit mode. After the route information from the starting point to the destination is drawn, the drawn route may be modified, until the user determines that drawing of the route information has been completed. The route information may include latitude and longitude of the starting point, latitude and longitude of the destination, and a drawn route. The drawn route may be identified in a color other than a color of the navigation interface.

The information sending module 404 is configured to send the route information to a navigation server, wherein the navigation server is configured to determine a navigation path from the starting point to the destination according to the route information, and further sends the navigation path to another terminal to prompt another user to arrive at the destination from the starting point in accordance with the navigation path.

During specific implementation, the route information is sent to the navigation server when a confirmation instruction of the user for the route information is detected. The navigation server determines the navigation path from the starting point to the destination according to the route information, and further sends the navigation path to the another terminal, wherein the another terminal displays the navigation path to prompt the another user to arrive at the destination from the starting point in accordance with the navigation path. In addition, the navigation server may calculate execution duration from the starting point to the destination according to the navigation path from the starting point to the destination; and send the execution duration to the another terminal, wherein the another terminal displays the execution duration.

For example, a user 1 sends a taxi hailing service request by using taxi hailing software. A user 2 determines to take the order after receiving the taxi hailing service request, and sends a confirmation message to a terminal of the user 1. In this case, the terminal of the user 1 may view, by using the taxi hailing software, a starting point where the terminal is located and a destination where the user 2 is located, draw a route on a navigation interface, and push the drawn route to the navigation server. After receiving the drawn route recommended by the terminal of the user 1, the navigation server selects, from multiple routes from the starting point to the destination, a navigation path closest to the drawn route, and sends the navigation path to a terminal of the user 2, wherein the user 2 may pick up the user 1 according to the navigation path.

In this embodiment of the present disclosure, first, a starting point and a destination that are set by a user are obtained. Then, the starting point and the destination are displayed on a navigation interface. Next, route information from the starting point to the destination is drawn on the navigation interface according to a swipe gesture of the user on the navigation interface. Finally, the route information is sent to a navigation server, wherein the navigation server determines a navigation path from the starting point to the destination according to the route information, and sends the navigation path to another terminal to prompt another user to arrive at the destination from the starting point in accordance with the navigation path. In this way, accuracy of route navigation is improved.

Figure 6:
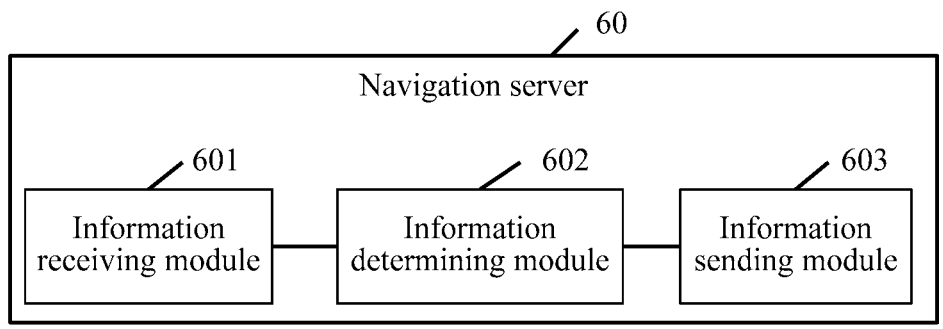
FIG. 6 is a schematic structural diagram of a navigation server according to embodiments of the present disclosure.

Referring to FIG. 6, FIG. 6 is a schematic structural diagram of a navigation server according to an embodiment of the present disclosure. As shown in FIG. 6, the navigation server in this embodiment of the present disclosure includes: an information receiving module 601, an information determining module 602, and an information sending module 603.

The information receiving module 601 is configured to receive route information from a starting point to a destination, the route information being sent by a terminal and drawn on a navigation interface.

During specific implementation, the terminal first obtains the starting point and the destination that are set by a user; then displays, on the navigation interface, the starting point and the destination; next draws, on the navigation interface, the route information from the starting point to the destination according to a swipe gesture of the user on the navigation interface; and finally sends the route information to the navigation server. The navigation server receives the route information.

The information determining module 602 is configured to determine a navigation path from the starting point to the destination according to the route information.

During specific implementation, the route information includes latitude and longitude of the starting point, latitude and longitude of the destination, and a drawn route. Multiple routes from the starting point to the destination may be determined according to the latitude and longitude of the starting point and the latitude and longitude of the destination. A target route closest to the drawn route may be selected from the determined multiple routes, and the target route is used as the navigation path.

Optionally, execution duration from the starting point to the destination may be calculated according to the navigation path from the starting point to the destination. Specifically, the length of the navigation path may be obtained, and the length of the navigation path is divided by an average speed to obtain the execution duration.

The information sending module 603 is configured to send the navigation path to another terminal, wherein the another terminal displays the navigation path to prompt another user to arrive at the destination from the starting point in accordance with the navigation path.

During specific implementation, the another terminal may send a navigation request to the navigation server. The navigation request carries the latitude and longitude of the starting point and the latitude and longitude of the destination. After receiving the navigation request, the navigation server may send the navigation path from the starting point to the destination to the another terminal, so as to share the route information entered by the user with the another user.

Optionally, the navigation server may receive a zoom ratio of the navigation interface sent by the terminal, and send the zoom ratio of the navigation interface to the another terminal, wherein the another terminal displays the navigation path according to the zoom ratio of the navigation interface.

Optionally, the navigation server may send the calculated execution duration from the starting point to the destination to the another terminal to notify the another user of the time that is spent from the starting point to the destination.

In this embodiment of the present disclosure, first, a starting point and a destination that are set by a user are obtained. Then, the starting point and the destination are displayed on a navigation interface. Next, route information from the starting point to the destination is drawn on the navigation interface according to a swipe gesture of the user on the navigation interface. Finally, the route information is sent to a navigation server, wherein the navigation server determines a navigation path from the starting point to the destination according to the route information, and sends the navigation path to another terminal to prompt another user to arrive at the destination from the starting point in accordance with the navigation path. In this way, accuracy of route navigation is improved.

Figure 7:
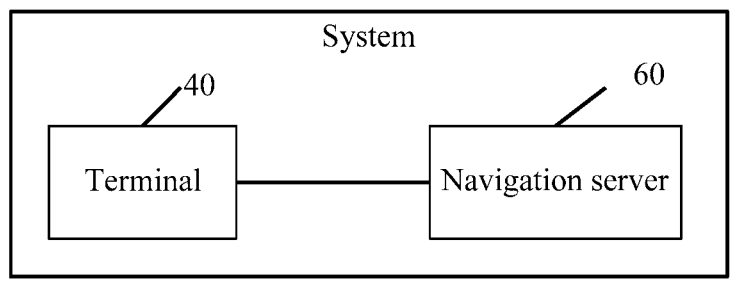
FIG. 7 is a schematic structural diagram of a route navigation system according to some embodiments of the present disclosure.

Referring to FIG. 7, FIG. 7 is a schematic structural diagram of a route navigation system according to an embodiment of the present disclosure. As shown in FIG. 7, the system in this embodiment of the present disclosure includes a terminal 40 and a navigation server 60.

The terminal 40 is configured to: obtain a starting point and a destination that are set by a user; display, on a navigation interface, the starting point and the destination; draw, on the navigation interface, route information from the starting point to the destination according to a swipe gesture of the user on the navigation interface; and send the route information to the navigation server, wherein the navigation server is configured to determine a navigation path from the starting point to the destination according to the route information, and further sends the navigation path to another terminal to prompt another user to arrive at the destination from the starting point in accordance with the navigation path.

The navigation server 60 is configured to: receive the route information from the starting point to the destination, the route information being sent by the terminal and drawn on the navigation interface; determine the navigation path from the starting point to the destination according to the route information; and send the navigation path to the another terminal, wherein the another terminal displays the navigation path to prompt the another user to arrive at the destination from the starting point in accordance with the navigation path.

It should be noted that, for brief description, the foregoing method embodiments are described as a series of actions. However, a person skilled in the art should learn that the present disclosure is not limited to the described order of the actions, because some operations may be performed in other orders or may be performed simultaneously according to the present disclosure. In addition, a person skilled in the art should also learn that all the embodiments described in this specification are preferable embodiments, and the involved actions and modules are not necessarily mandatory to the present disclosure.

In the foregoing embodiments, the descriptions of the embodiments have respective focuses. For a part that is not described in detail in an embodiment, refer to related descriptions in other embodiments.

A person of ordinary skill in the art may understand that all or some of the operations of in the foregoing method embodiments may be completed by invoking a computer program instructing relevant hardware. The program may be stored in a computer readable storage medium. When the program is invoked, hardware may be caused to perform procedures of the foregoing method embodiments. The computer readable storage medium may include, but is not limited to, a flash drive, a read-only memory (ROM), a random access memory (RAM), a magnetic disk, and an optical disc. In addition, the computer readable storage medium may be various types of recording media that may be accessed by a computer apparatus by using a network or a communication link, for example, a recording medium whose data may be extracted by using a router, the Internet, a local area network, and the like. In addition, the computer readable storage medium may refer to, for example, multiple computer readable storage media in a same computer system, or may refer to, for example, computer readable storage media in multiple computer systems or computing apparatuses.

Figure 8:
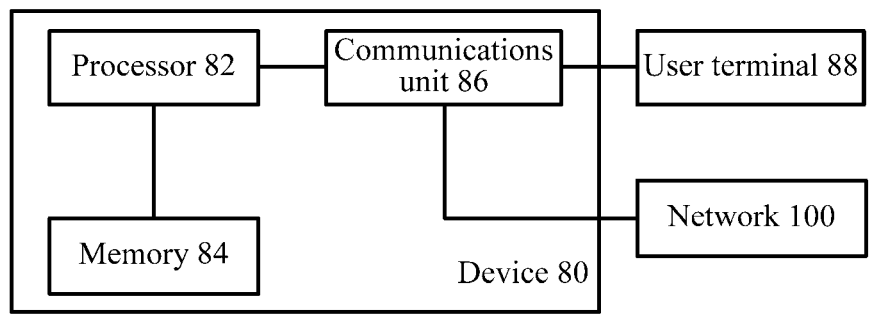
FIG. 8 is a structural block diagram of a device according to some embodiments of the present disclosure.

In addition, an embodiment of the present disclosure further provides a device. FIG. 8 is a structural block diagram of a device according to an embodiment of the present disclosure. As shown in FIG. 8, the device 80 may include a processor 82 and a memory 84, and optionally, includes a communications unit 86. The processor 82 may be considered as a control center of the device, and is connected to another component in the device in a wired or wireless manner by using an interface or a line. In an implementation, the processor 82 and the memory 84 may be connected by using a data bus. The processor 84 may be connected to a user terminal 88 or a network 100 in a wired or wireless manner by using an interface (which may be a wired interface or a wireless interface) or the communications unit 86, to implement data exchange and communication with the outside. Similarly, the memory 64 may include, but is not limited to, a ROM, a RAM, a CD-ROM, and other removable memories, which store program code, a functional module, and the like. Specifically, the memory 84 stores a computer program or a functional module. When the processor 82 invokes and executes the computer program or the functional module by accessing the memory 84, the operations according to any one of the embodiments of the present disclosure may be implemented. In addition, operations in this embodiment of the present disclosure are already described in detail in the foregoing specification in accordance with the accompanying drawings. To avoid obscuring the present disclosure, details are not described herein again.

The route navigation method and related device and system that are provided in the embodiments of the present disclosure are described in detail above. The principle and the implementations of the present disclosure are described in this specification by using specific examples. The description about the foregoing embodiments is merely provided to help understand the method and the core ideas of the present disclosure. A person of ordinary skill in the art can make variations to specific implementations and application scopes according to the ideas of the present disclosure. Therefore, the content of the specification shall not be construed as a limitation to the present disclosure.

What is claimed is:

1. A route navigation method performed at a first terminal having one or more processors and memory, the first terminal configured to be in communication with a second terminal via a navigation server, the method comprising:
    obtaining a starting point and a destination that are set by a user;
    displaying, on a navigation interface, the starting point and the destination;
    drawing, on the navigation interface, route information from the starting point to the destination according to a swipe gesture of the user on the navigation interface along a routing path from the starting point to the destination; and
    sending route forwarding instruction to the navigation server, wherein sending the route forwarding instruction includes:
        sending the route information to the navigation server, wherein the navigation server is configured to determine a navigation path from the starting point to the destination according to the route information, wherein the navigation path is not the same as the routing path from the starting point to the destination defined by the swipe gesture of the user, and;
        sending a request for the navigation server to forward the navigation path to the second terminal to prompt another user to view a current location of the user of the first terminal and arrive at the destination from the starting point in accordance with the navigation path.

2. The method according to claim 1, wherein displaying, on the navigation interface, the starting point and the destination comprises:
    obtaining a preset zoom ratio of the navigation interface in accordance with a distance between the starting point and the destination point; and
    displaying, on the navigation interface, the starting point and the destination according to the zoom ratio of the navigation interface.

3. The method according to claim 1, wherein the route information includes a hand-drawn route, and the determining the navigation path from the starting point to the destination according to the route information comprises:
    determining multiple routes from the starting point to the destination; and
    selecting, from the determined multiple routes, a target route closest to the hand-drawn route as the navigation path.

4. The method according to claim 1, including:
    prior to receiving the swipe gesture from the user, displaying, to the user, a suggested route from the starting point to the destination that is generated by the navigation server in accordance with preset routing algorithm, wherein the swipe gesture modifies at least a portion of the suggested route.

5. The method according to claim 4, including:
    receiving the swipe gesture from the user, wherein the swipe gesture drags one or more points on the suggested route to modify the suggested route.

6. The method according to claim 4, including:
    receiving the swipe gesture from the user, wherein the swipe gesture draws a line on the navigation interface that replaces at least a portion of the suggested route.

7. The method of claim 1, wherein the navigation interface is displayed in a ride request application interface, the first terminal is a rider's terminal and the second terminal is a driver's terminal.

8. A device serving as a first terminal that is configured to be in communication with a second terminal via a navigation server, comprising:
one or more processor; and
memory, wherein the memory stores instructions, the instructions, when executed by the one or more processors, cause the processors to perform operations comprising:
obtaining a starting point and a destination that are set by a user;
displaying, on a navigation interface, the starting point and the destination;
drawing, on the navigation interface, route information from the starting point to the destination according to a swipe gesture of the user on the navigation interface along a routing path from the starting point to the destination; and
sending route forwarding instruction to the navigation server, wherein sending the route forwarding instruction includes:
sending the route information to the navigation server, wherein the navigation server is configured to determine a navigation path from the starting point to the destination according to the route information, wherein the navigation path is not the same as the routing path from the starting point to the destination defined by the swipe gesture of the user, and;
sending a request for the navigation server to forward the navigation path to the second terminal to prompt another user to view a current location of the user of the first terminal and arrive at the destination from the starting point in accordance with the navigation path.

9. The device according to claim 8, wherein displaying, on the navigation interface, the starting point and the destination comprises:
obtaining a preset zoom ratio of the navigation interface in accordance with a distance between the starting point and the destination point; and
displaying, on the navigation interface, the starting point and the destination according to the zoom ratio of the navigation interface.

10. The device according to claim 8, wherein the route information includes a hand-drawn route, and the determining the navigation path from the starting point to the destination according to the route information comprises:
determining multiple routes from the starting point to the destination; and
selecting, from the determined multiple routes, a target route closest to the hand-drawn route as the navigation path.

11. The device according to claim 8, wherein the operations include:
prior to receiving the swipe gesture from the user, displaying, to the user, a suggested route from the starting point to the destination that is generated by the navigation server in accordance with preset routing algorithm, wherein the swipe gesture modifies at least a portion of the suggested route.

12. The device according to claim 11, wherein the operations include:
receiving the swipe gesture from the user, wherein the swipe gesture drags one or more points on the suggested route to modify the suggested route.

13. The device according to claim 11, wherein the operations include:
receiving the swipe gesture from the user, wherein the swipe gesture draws a line on the navigation interface that replaces at least a portion of the suggested route.

14. The device of claim 8, wherein the navigation interface is displayed in a ride request application interface, the first terminal is a rider's terminal and the second terminal is a driver's terminal.

15. A non-transitory computer readable storage medium storing instructions, the instructions, when executed by one or more processors, cause the processors to perform operations comprising:
at a first terminal that is configured to be in communication with a second terminal via a navigation server, comprising:
obtaining a starting point and a destination that are set by a user;
displaying, on a navigation interface, the starting point and the destination;
drawing, on the navigation interface, route information from the starting point to the destination according to a swipe gesture of the user on the navigation interface along a routing path from the starting point to the destination; and
sending route forwarding instruction to the navigation server, wherein sending the route forwarding instruction includes:
sending the route information to the navigation server, wherein the navigation server is configured to determine a navigation path from the starting point to the destination according to the route information, wherein the navigation path is not the same as the routing path from the starting point to the destination defined by the swipe gesture of the user, and;
sending a request for the navigation server to forward the navigation path to the second terminal to prompt another user to view a current location of the user of the first terminal and arrive at the destination from the starting point in accordance with the navigation path.

16. The non-transitory computer-readable storage medium according to claim 15, wherein displaying, on the navigation interface, the starting point and the destination comprises:
obtaining a preset zoom ratio of the navigation interface in accordance with a distance between the starting point and the destination point; and
displaying, on the navigation interface, the starting point and the destination according to the zoom ratio of the navigation interface.

17. The non-transitory computer-readable storage medium according to claim 15, wherein the route information includes a hand-drawn route, and the determining the navigation path from the starting point to the destination according to the route information comprises:
determining multiple routes from the starting point to the destination; and
selecting, from the determined multiple routes, a target route closest to the hand-drawn route as the navigation path.

18. The non-transitory computer-readable storage medium according to claim 15, wherein the operations include:
prior to receiving the swipe gesture from the user, displaying, to the user, a suggested route from the starting point to the destination that is generated by the navigation server in accordance with preset routing algorithm, wherein the swipe gesture modifies at least a portion of the suggested route.

19. The non-transitory computer-readable storage medium according to claim 18, wherein the operations include:
receiving the swipe gesture from the user, wherein the swipe gesture drags one or more points on the suggested route to modify the suggested route.

20. The non-transitory computer-readable storage medium according to claim 18, wherein the operations include:
receiving the swipe gesture from the user, wherein the swipe gesture draws a line on the navigation interface that replaces at least a portion of the suggested route.

* * * * *